3,616,631
SNAP-ON TOOTH FOR AGRICULTURAL EQUIPMENT

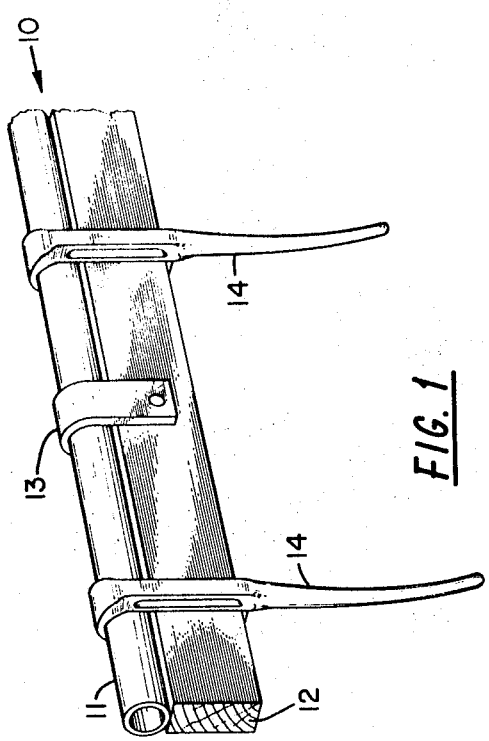
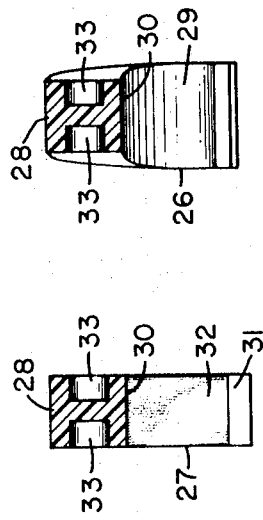
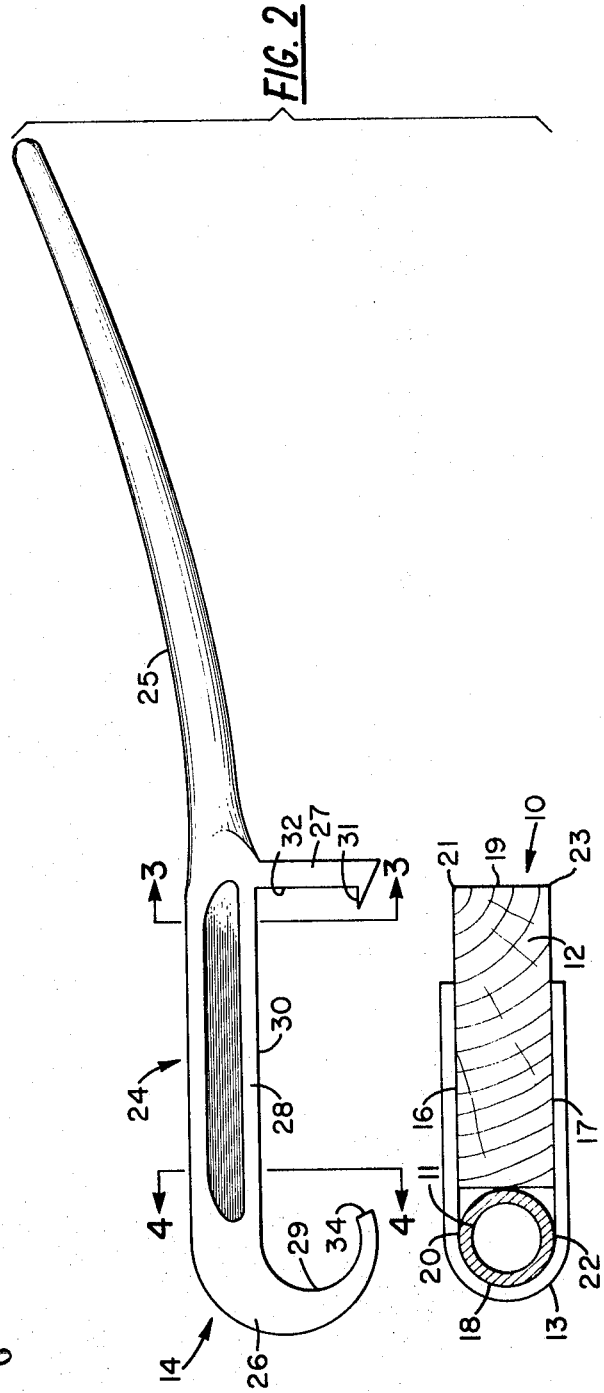
HENRY A. QUAM INVENTOR.
BY Robert L. Graham
ATTORNEY

Henry A. Quam, Edmonton, Alberta, Canada, assignor to Imperial Oil Limited, Toronto, Ontario, Canada
Filed Jan. 12, 1970, Ser. No. 2,209
Int. Cl. A01d 7/00
U.S. Cl. 56—400      2 Claims

ABSTRACT OF THE DISCLOSURE

A snap-on tooth for an agricultural implement wherein the tooth includes a mounting base and a tine extending from the base. The base clamps to a tooth supporting bar in a snap-on manner. The hooks or other clamping elements of the base are resiliently yieldable to permit snap-on attachment at any longitudinal location along the bar.

BACKGROUND OF THE INVENTION

(1) Field of the invention

This invention relates to agricultural implements. In one aspect it relates to detachable teeth usable on pickup reels.

(2) Description of the prior art

Pickup reels are employed in a variety of agricultural implements such as windrowers, harvesters, combines, tedders and the like and perform the function of lifting a grass crop such as hay or cereal grain to assist in the cutting action of the implement cutter bar. The conventional pickup reel comprises a plurality of support bars assembled in parallel and circumferentially spaced relation. Each bar is provided with a plurality of downwardly extending teeth geometrically arranged to effect a lifting and sweeping action on the crop attendant to rotation of the reel. The teeth must be secured to the support bar to maintain the proper tine spacing; they must be flexible to yield when foreign objects such as large rocks or fence posts are encountered; and, finally, they must be resilient to maintain the proper tine attitude for lifting and sweeping the crop. From time to time it becomes necessary to replace the teeth that have become worn or damaged. In order to facilitate rapid replacement, the teeth are generally individually detachable from their associated support bar.

Because of their improved resistance to abrasion and improved flexibility, plastic teeth are ideally suited for service on pickup reels. In order to accommodate the presently available plastic teeth, the pickup reels generally require a support bar designed specifically for the type of tooth used. Thus, a reel provided with the conventional wooden bat-bar assembly requires modification to place it in condition to receive the plastic teeth. This usually entails replacement of the entire bat-bar assembly or the addition of special adapters. In either situation the location of tooth attachment is fixed so that the tooth spacing can not be varied at will.

SUMMARY OF THE INVENTION

The present invention provides a plastic tooth configurated for snap-on attachment to an implement support bar requiring no fasteners such as bolts, screws and the like. In one preferred embodiment, the tooth can be configurated to fit conventional bat-bars. The configuration of the tooth is such that it can be snapped on the support bar at any longitudinal location thereby permitting the facile and rapid exchange of parts. Since no special adapters or mechanical fasteners are required, the longitudinal spacing of the teeth can be varied at will.

The tooth has a base adapted to clamp onto the support bar and a tine depending from the base. Preferably the tooth is a one-piece, unitary structure composed of a plastic material having the characteristics of toughness, resiliency, and flexibility. Such a tooth can be made by conventional plastic molding techniques.

The base is configurated to provide snap-on action. In a preferred form it includes upper and lower hooks for clamping onto the top and bottom edges, respectively, of the support bar. A body portion interconnects the hooks and engages the leading surface (reference to the direction of bar movement during the feeding stroke) of the bar and thus maintains the tine depending therefrom in the proper attitude.

In the detached position, the hooks are spaced apart slightly less than the corresponding height of the support bar and at least one of the hooks is resiliently yieldable to permit snap-on connection to the bar. In the attached position, the hooks are preferably adapted to impart a compressive clamping force on the bar disposed therebetween. The hooks are provided with confronting bearing surfaces having lateral dimensions substantially greater than the lateral dimension of the tine. The relatively wide bearing surfaces and the compressive holding force combine to maintain the base securely to the support bar so that lateral bending of the tooth does not cause the base to creep laterally from its attached position. The base and the bar have a self-locking relationship in that extraneous mechanical fasteners are not required.

In addition to the convenience offered by the novel tooth snap-on action, it will be appreciated that the tooth constructed according to the present invention offers the added advantage of permitting a variable tooth spacing without modification of the support bar.

BRIEF DESCRIPTION OF THE DRAWINGS

FIG. 1 is a fragmentary perspective view of a bat-bar shown supporting a pair of teeth constructed according to the present invention.

FIG. 2 is a side elevational, exploded view of a tooth shown detached from its associated bat-bar.

FIG. 3 is a transverse sectional view of FIG. 2 taken generally along the cutting plane indicated by line 3—3 thereof.

FIG. 4 is a transverse sectional view of FIG. 2 taken generally along the cutting plane indicated by the line 4—4 thereof.

DESCRIPTION OF THE PREFERRED EMBODIMENT

With reference to FIG. 1, a support bar 10 is seen to include a shaft 11 and a wooden bat 12 maintained in rigid assembly by a plurality of laterally spaced clips, one shown as 13. The support bar 10 illustrated in FIGS. 1 and 2 is the conventional wooden bat-bar construction widely used in commercial pickup reels. Detachably mounted on the bar 10 are a plurality of teeth 14 constructed according to the present invention.

As best seen in FIG. 2, the bar 10 includes a leading surface 16, a trailing surface 17 (reference to the direction of bar movement), a top surface 18 and a bottom surface 19. The top surface 18 of the support bar 10 in this embodiment is in the form of a circular arc defined by the shaft 11, and the bottom surface 19 is defined by the lower edge of the wooden bat 12. The leading surface 16 extends downwardly from the tangent line denoted 20 of shaft 11 across the front side of bat 12 terminating at the lower corner 21. The trailing surface 17 is similarly defined by a tangent line 22 on shaft 11 and the lower corner 23 of bat 12.

The outside diameter of shaft 11 can be equal to the thickness of bat 12 so that the tangent lines 20 and 22, respectively, lie in the planes defined by the front and back sides of the bat 12.

As shown in FIG. 2 the tooth 14 comprises a base 24 and a tine 25 extending outwardly therefrom. The base 24 is configured to snap onto the support bar 10 in fixed relation thereby maintaining the tine 25 in the proper crop lifting and sweeping attitude. The base 24 includes an upper hook 26, a lower hook 27, and a body portion 28 interconnecting the hooks 26 and 27. The hooks 26, 27, and body 28 can be integrally formed and preferably integral with the tine 25. The upper hook 26 is adapted to latch onto the upper edge of the bat bar 10. The upper hook 26 is provided with an inner surface 29 shaped generally complementary to the configuration of the top surface 18 of the bar 10. With the tooth 14 attached to the bar 10, the inner surface 29 engages a circumferentially extending surface of the shaft 11 extending from the tangent line 20 and terminating slightly past the diametric tangent line 22. With the body portion 28 engaging the leading surface 16, the hook 26 then extends around the top surface 18 terminating in engagement with the trailing surface 17. The radius of curvature of the hook surface 29 can be slightly less than the radius of the shaft 11 so that with the tooth 14 attached to the bar 10 the distal end 34 of the hook 26 is stressed outwardly. This imparts a holding force on the body portion 28.

The body portion 28 is provided with a relatively wide bearing surface 30 adapted to engage the leading surface 16 of the bat bar 10 (see FIG. 3).

The lower hook 27 is configured to latch onto the lower edge of the support bar 10. For latching onto the flat bottom wooden bat 12 shown in FIG. 2, the hook 27 extends generally perpendicularly outwardly from the base of surface 30 and has formed in its outer end an upwardly projecting tip 31. The lower hook 27 has an upwardly facing surface 32 aligned in confronting relation with the downwardly facing surface 29 of the upper hook 26, with the ends of the hooks extending generally toward one another. The surface 32 and tip 31 are sized to snugly receive the lower edge of the bar 10. The spacing between confronting parts of the hooks 26 and 27 is such that when the tooth 14 is snapped onto the support bar 10, the hooks exert a slight compressive force on the bar 10 sandwiched therebetween. This compressive holding force increases when the tine 25 is flexed rearwardly under load. In order to facilitate the snap-on action, at least one of the hooks 26 and 27 is resiliently yieldable. In order to conserve on material the base 24 can have longitudinally extending grooves 33 formed in opposite sides (see FIGS. 3 and 4).

The tine 25 extends downwardly from the base 24 and is of tapering configuration from top to bottom having the greatest cross sectional area adjacent the base 24 and the least cross sectional area at its tip. Transversely, the tine 25 can be circular or oval in configuration. Longitudinally, the tine 25 can be arcuate in configuration bending gently forward from the longitudinal axis of the base 24.

The bearing surfaces provided by hook surfaces 29 and 32 and body surface 30 are of greater lateral extent than the lateral dimension of the tooth 25. Thus the tine 25 is far more flexible than the base 24. Moreover, the relatively wide surfaces provide a large reaction base for forces tending to laterally deflect the tooth 14 from its attached position on the bar 10. As shown in FIGS. 3 and 4 the lateral dimensions of surfaces 30 and 32 can be the same. In order to permit snap on action, the vertical or radial dimension of hook 26 can be thinner than the thickness of body portion 28. Thinness lends flexibility to the hook 26. The lateral dimension of surface 29 can be greater than that of surface 30 as shown in FIG. 4.

Because of its properties of toughness, flexibility, and resistance to wear, elastomeric polymers such as nylon or one of the polyolefins are preferred as a construction material for the tooth 14. Specific examples of a suitable material are Delrin 100, an acetal resin, and Adiprene, a urethane elastomer, both of which are products of E. I. du Pont de Nemours.

Although the construction of the tooth 14 described herein is such to cooperate with the conventional wooden bat-bar 10, it should be observed that surfaces 29, 30, and 32 can be custom shaped to fit support bars of diverse configurtion and description.

An important feature of the tooth 14 constructed according to the present invention is its ability to adapt to support bars 10 without the necessity of specially configurated bars or adapters. Thus when a tooth 14 becomes damaged or worn, it can easily be replaced by merely detaching the old tooth and snapping on a new one. This invention has the added advantage of permitting a variable tooth spacing. If it is desired to change the spacing of a given array, the snap-on teeth can be removed, or added, or the teeth 14 can be moved laterally along the support bar to form the desired array.

I claim:

1. In an agricultural pickup reel having a support bar and a plurality of teeth detachably mounted thereon, the improvement wherein each tooth includes a base and a tine integrally formed in a one-piece structure composed of a resilient, yieldable elastomeric material, said base having a body portion engageable with a leading surface of said support bar, an upper hook extending from said body portion rearwardly and engagingly around a top surface of said support bar and having its outer end engageable with a trailing surface of said support bar, and a lower hook extending from said body portion rearwardly and engagingly around a bottom surface of said support bar ad having its outer end engageable with a trailing surface of said support bar, the spacing of said hooks being such to impart a compressive force on the support bar disposed therebetween, and the engagement of said hooks and said body portion on said bar being of sufficient lateral extent to maintain the tooth in fixed relation on said support bar without the necessity of additional fastening means.

2. A one-piece plastic snap on tooth for attachment to a support bar of an agricultural implement comprising: a body portion engageable with a leading surface of said support bar, an upper flexible and resilient hook extending from said body portion rearwardly and engagingly around a top surface of said support bar and having a portion engageable with a trailing surface of said support bar, and a lower flexible and resilient hook extending from said body portion rearwardly and engagingly around a bottom surface of said support bar and having a portion engageable with a trailing surface of said support bar, the spacing of said hooks being such to impart a compressive force on said support bar disposed therebetween, and the engagement of said hooks and said body portion on said support bar being of sufficient lateral extent to maintain the tooth in fixed relation thereon without the necessity of additional fastening means.

References Cited

UNITED STATES PATENTS

| | | | |
|---|---|---|---|
| 2,608,045 | 8/1952 | Keene | 56—400 |
| 3,066,470 | 12/1962 | Johnston | 56—400 |
| 3,148,494 | 9/1964 | Scheidenhelm | 56—400 |
| 3,468,109 | 9/1969 | Reimer | 56—400 X |
| 2,490,710 | 12/1949 | Rugg | 56—400 X |
| 2,603,936 | 7/1952 | Keene | 56—400 |
| 3,394,537 | 7/1968 | Keene | 56—400 |

LOUIS G. MANCENE, Primary Examiner

D. L. WEINHOLD, Assistant Examiner